Feb. 2, 1937.  J. E. P. BURGE ET AL  2,069,575
ELECTRICAL SYSTEM OF DISTRIBUTION
Filed March 19, 1936  3 Sheets-Sheet 1

INVENTORS
J. E. P. Burge
E. H. Roughton
BY Mawhinney & Mawhinney
ATTORNEYS.

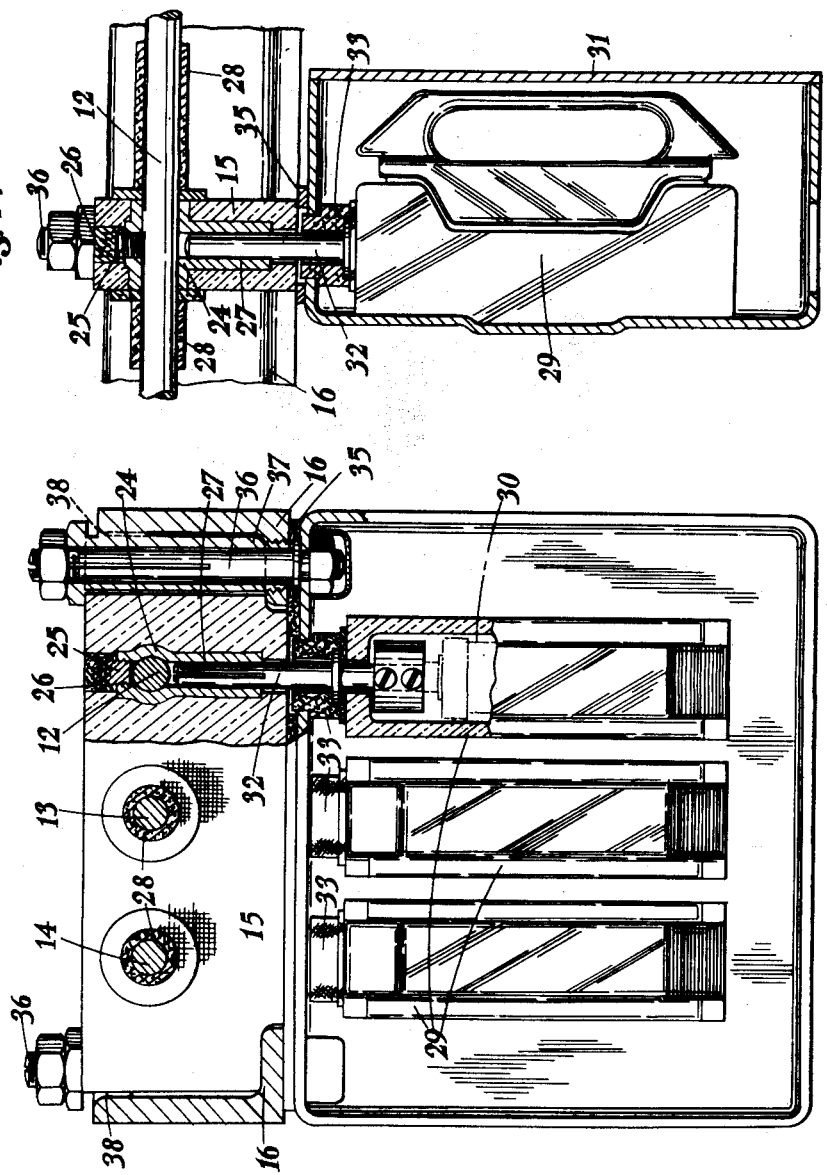

Feb. 2, 1937.  J. E. P. BURGE ET AL  2,069,575
ELECTRICAL SYSTEM OF DISTRIBUTION
Filed March 19, 1936  3 Sheets-Sheet 3
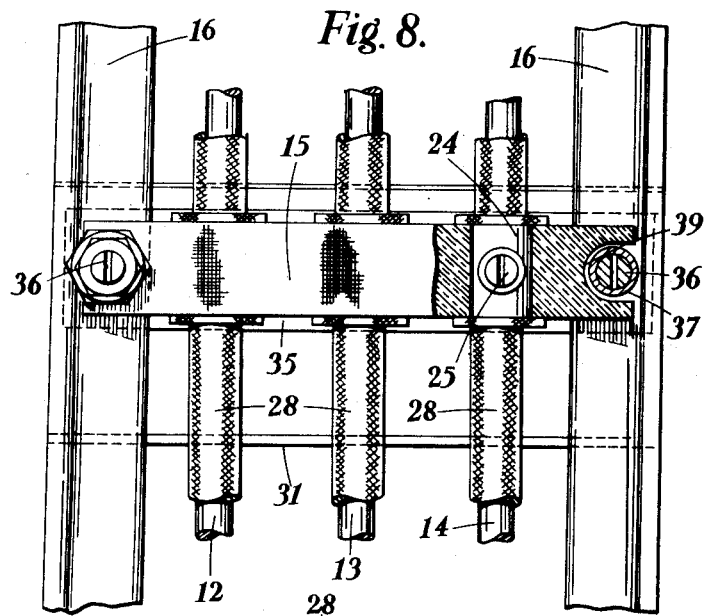
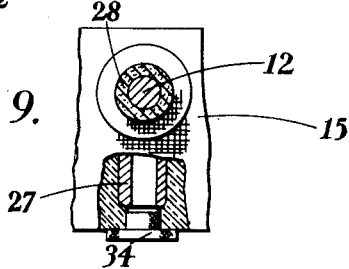
INVENTORS
J. E. P. Burge
and E. H. Roughton
BY
Mawhinney & Mawhinney
ATTORNEYS.

Patented Feb. 2, 1937

2,069,575

UNITED STATES PATENT OFFICE 2,069,575

ELECTRICAL SYSTEM OF DISTRIBUTION

John Ernest Percival Burge and Ernest Alfred Roughton, Coventry, England, assignors to Humber Limited, Coventry, England Application March 19, 1936, Serial No. 69,735
In Great Britain April 18, 1935

6 Claims. (Cl. 175—298)

This invention relates to systems of electric distribution for "production" shops and the like, the main object being to provide an improved system for use in production shops and other buildings or places containing a number of electrically-operated machine-tools or other power-consuming devices which are liable to be altered in position and as regards their number from time to time. Thus, in the case of an ordinary production shop containing electrically-driven machine-tools, with the system of the invention fresh machine-tools can be added wherever space permits and the existing machine-tools can be rearranged as desired with a minimum of trouble, without the need for any temporary connections, and whilst the system is kept alive. Furthermore, a faulty unit can be at once disconnected for repairs without any other units being affected.

The invention does not relate to the supporting of busbars for electrical switchboards nor to the supporting of electric cables in general.

A system according to the main feature of the invention includes insulated conductors held in spaced relation by transversely-arranged insulating blocks all of which are spaced from one another along the conductors and are supported from a light framework. The latter preferably includes two parallel, angle-section or other flanged metal bars. By forming some at least of the blocks with sockets containing contacts connected to the respective conductors the making of the necessary connections to the power-consuming devices is facilitated.

In a preferred arrangement an insulating block is provided with openings through which the conductors pass and which are intersected by transverse openings, and each combined opening, which is T-shaped, contains a hollow T-shaped contact the head of which embraces the associated conductor (being secured thereto, if desired, by a grub screw or the like) while the tail can receive a plug-in pin.

Preferably the power-consuming devices are connected to fuse-containing boxes adapted to plug into the sockets and to be held in position by bolts or the like. Preferably, too, the fuse-containing boxes can be earthed by holding bolts engaged with the framework.

In carrying out the invention use is preferably made of a plurality of built-up structures of uniform lengths joined to one another, each structure being arranged as above-mentioned.

In the accompanying drawings:—

Figure 6 is a part-sectional elevation, to a larger scale, mainly through one of the insulating cleats or blocks of the structure of Figures 1 and 2, but showing a fuse-containing box plugged into a multi-socket;

Figure 7 is a part-sectional elevation of the cleat and fuse-containing box of Figure 6, taken at right-angles thereto;

Figure 8 is a part-sectional plan thereof; and

Figure 9 is a fragmentary sectional view, similar to that of Figure 6, indicating how one of the sockets may be plugged when no fuse-containing box is connected to it.

Figure 1:
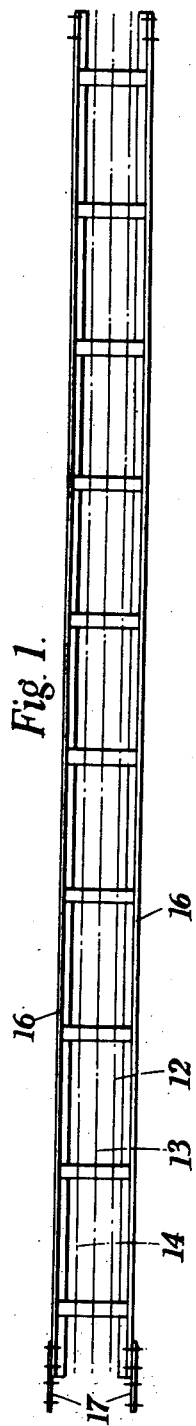
Figure 1 is a plan, and Figure 2 an elevation, of a built-up structure forming part of a system of electric power distribution according to the invention, but with no fuse-containing boxes shown attached to the multi-sockets.
Figure 2:
Figure 5:
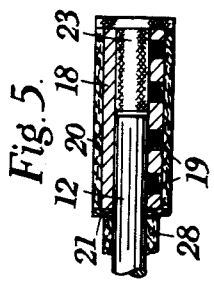
Figure 5 is a view indicating how a conductor of an end structure may be plugged.
Figure 4:
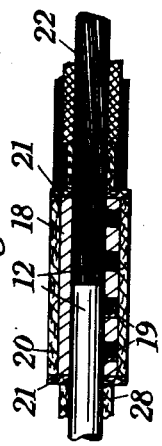
Figure 4 is a view indicating a joint between a conductor of one of the structures and one of the phases of a supply cable.
Figure 3:
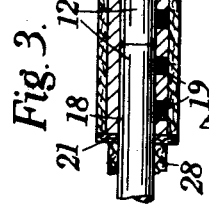
Figure 3 is a view indicating how two conductors of different built-up structures can be joined to one another.

In carrying out the invention use is preferably made of a plurality of built-up structures, of the kind shown by Figures 1 and 2, joined to one another to extend throughout the production shop or other building which is to be wired. As a matter of convenience each built-up structure may be, say, ten feet long. It consists in this instance of three electric conductors in the form of rigid copper rods, 12, 13, 14, for a three-phase supply, held in spaced relation by insulating cleats or blocks 15, 15, as shown most clearly in Figures 6 to 8. The blocks are supported from the flanges of two angle irons 16, 16 forming a light framework. Two such units may be joined together by means of fish plates 17, 17 interconnecting the adjacent angle irons, copper bonds being provided to ensure adequate earthing, while the joints between adjacent copper rods can be effected by means of brass or other metal sleeves 18 (Figure 3) surrounding the adjacent ends of the rods and held in position by grub screws 19, the sleeves being fitted within insulating tubes 20 and between insulating end discs 21. Figure 4 shows a similar method of connecting one of the copper rods to one of the supply phases 22. At the dead end of any structure an insulating plug 23 may be secured in position in the metal sleeve 18, as indicated by Figure 5.

The blocks are preferably arranged, say, at twelve inches distance from one another. Each of them is formed with three T-shaped holes in it such holes containing hollow T-shaped metal connectors 24, 24. Through the heads of these connectors pass the copper rods in contact therewith, being located therein by means of grub screws 25. These latter may be inserted from the upper end through openings which can be filled in with insulating compound 26. The tails 27 of the T-shaped connectors form socket contacts to receive plugging pins.

In this way each cleat or block forms an insulated multi-socket, such multi-sockets being spaced at intervals of, say, a foot along the system throughout the building. Thus, by means of an appropriate plug electric power can be tapped from any of the multi-sockets and taken direct to an electrically-operated machine-tool or other power-consuming device. Between the blocks the conductors are encased individually in insulating tubes 28, which may be moulded from a synthetic resin.

The drawings show, in Figures 6 to 8, a fuse-containing box with three insulating members 29, 29 in it. Each of these has spaced in it a pair of contacts which can be interconnected by a detachable cartridge or other fuse 30. Access to the detachable fuses is provided by means of a detachable cover 31 conveniently hinged to the box along one edge. The top contact in each case is formed integrally with or has secured to it a plugging pin 32 adapted to fit a connector socket 27. The pin 32 passes through the insulating bushing 33 held between the insulating member 29 and the box and entered through an opening in the latter as shown. The lower contacts are connected to an armoured, flexible or other outgoing cable, not shown, leading to the power-consuming device through an isolating switch which would for convenience be mounted on the latter.

Thus, when a power-consuming device is to be connected in, an insulating plug, such as that marked 34 in Figure 9, is removed from each of the three sockets in any appropriate block and, with the fuses also detached, the box is plugged in as shown by Figures 6 to 8, preferably with an asbestos washer 35 interposed between the box and the block and angle irons. The box is then secured in position by means of nuts and bolts 36 which, as shown, engage sleeves 37 carried by the angle irons. These sleeves are conveniently screwed into holes in the flanges and then welded, as indicated at 38. Incidentally, the sleeves 37 extend into recesses 39 provided at the ends of the block, as shown by Figure 8, to locate the block against movement along the light framework.

These same bolts, it will be observed, serve for earthing the box to the framework. For preference they are carried by the box, as shown at the right in Figure 6, and they are of larger section and longer than the plugging pins 32 so that there is no possibility of one of the bolts being inadvertently forced into one of the live sockets, and the box must be earthed before the socket 27 is engaged by a pin 32. When the box is secured in this way the fuses can be replaced and the power-consuming device then brought into action. During the making of this connection the system can remain alive, yet at the same time the operation can be carried out with safety.

When a power-consuming device is to be replaced or removed, or if a fault should develop in the lead to it from the system, the isolation switch is opened and then the above procedure is reversed. That is to say, after the fuses have been detached the box can safely be withdrawn on the detachment of the nuts and bolts 36.

Thus, by means of the invention, time is saved in connecting in and disconnecting an electrically-operated machine-tool or other power-consuming device, and if a fault should occur in the wiring to the device or in the device itself the latter can be quickly and safely isolated without any interference to the rest of the system. There is no necessity to render any part of the system dead whilst connecting in or disconnecting a device. Furthermore, the system can be rendered waterproof, dustproof and fireproof and all the various electrical standards can be observed whilst no material has to be scrapped when the shop layout is remodelled.

What we claim as our invention and desire to secure by Letters Patent of the United States is:—

1. A system of electrical distribution for production shops and the like, including a plurality of rigid conductors, a plurality of transversely-arranged insulating blocks for holding said conductors in spaced relation, said blocks being spaced along said conductors, a pair of parallel flanged metal bars supporting the ends of said blocks, and insulating tubes individually encasing said conductors between said blocks.

2. A system of electrical distribution for production shops and the like, including a plurality of insulated conductors, a plurality of transversely-arranged insulating blocks for holding such conductors in spaced relation, said blocks being spaced along said conductors, and a metal framework directly supporting said blocks, some at least of said blocks having openings therein containing contacts connected to the respective conductors.

3. In a system of electrical distribution for production shops and the like, a plurality of conductors, an insulating block for supporting said conductors, said block having openings through which said conductors pass, said openings intersected by transverse openings, each combined opening being T-shaped, and T-shaped contacts contained in said T-shaped openings, the heads of said T-shaped contacts embracing the associated conductor while the tail can receive a plug-in pin.

4. A system of electrical distribution for production shops and the like, including a plurality of insulated conductors, a plurality of insulated sockets connected therewith, a light metal framework for supporting said conductors and sockets, fuse-containing boxes adapted to plug into said sockets, and bolts for rigidly holding said boxes to said framework, said bolts also serving for earthing said boxes to said framework, said bolts arranged to effect earthing of said boxes to said framework before said boxes are electrically connected to said sockets.

5. A system of electrical distribution for production shops and the like, comprising rigid conductors, insulating blocks supporting said conductors approximately every foot, metal bars supporting the ends of said blocks, said blocks having holes containing contacts connected, respectively, to said conductors, fuse-containing boxes adapted to plug into said contacts, and detachable means for holding and earthing said boxes to said bars.

6. A system of electrical distribution for production shops and the like, comprising rigid conductors, insulating blocks supporting said conductors approximately every foot, metal bars supporting the ends of said blocks, said blocks having holes containing contacts connected, respectively, to said conductors, and fuse-containing boxes adapted to plug into said contacts.

JOHN ERNEST PERCIVAL BURGE.
ERNEST ALFRED ROUGHTON.